Figure 1:
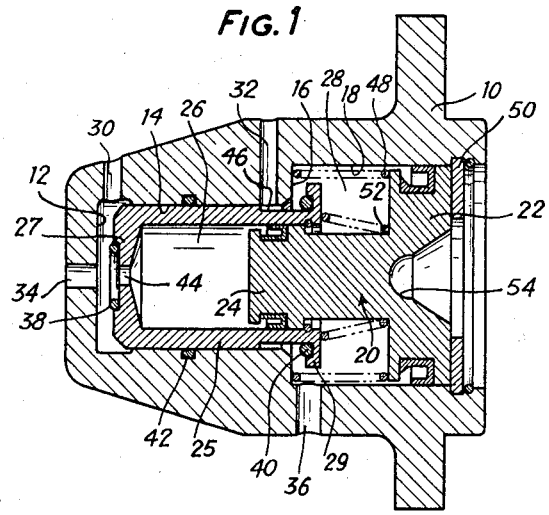

United States Patent [19]
Papiau

[11] 3,800,540
[45] Apr. 2, 1974

[54] DOUBLE MASTER CYLINDER
[75] Inventor: Guy Papiau, Arnouville Les Gonesse, France
[73] Assignee: Societe Anonyme D.B.A., Paris, France
[22] Filed: June 7, 1972
[21] Appl. No.: 260,605

[30] Foreign Application Priority Data
June 18, 1971  France .............................. 71.22191

[52] U.S. Cl. .................................... 60/581, 60/585
[51] Int. Cl. ............................................... F15b 7/08
[58] Field of Search ........ 60/54.5 E, 54.6 E, 54.6 R, 60/54.6 A, 581, 594, 585

[56] References Cited
UNITED STATES PATENTS
| 3,473,634 | 10/1969 | Strifler et al. | 60/54.5 E |
| 3,633,367 | 1/1972 | Baldwin | 60/54.6 E |
| 3,487,641 | 1/1970 | Hackett | 60/54.6 R |
| 3,172,265 | 3/1965 | Randol | 60/54.6 E |

Primary Examiner—Edgar W. Geoghegan
Assistant Examiner—A. M. Zupcic
Attorney, Agent, or Firm—Leo H. McCormick, Jr.; William N. Antonis

[57] ABSTRACT

Double master-cylinder having a body comprising a blind stepped bore in which a stepped piston is slidably mounted to define therein two variable volume pressure chambers adapted to be connected to separate hydraulic brake actuators, a single valve member consisting of an annular sleeve slidably disposed between the small diameter portion of the piston and the bore, and a spring provided between the sleeve and the piston in order to bring the sleeve to bear in fluid-tight manner on the body to close the refill passages communicating the pressure chamber to a brake fluid reservoir.

11 Claims, 2 Drawing Figures

DOUBLE MASTER CYLINDER

The invention relates essentially to a hydraulic master-cylinder for operating two sets of brake actuators associated with two independent braking circuits.

A tandem master-cylinder already proposed has a body containing a bore in which a control piston operated by an intake controlling rod and a floating piston are slidably mounted, to define two variable-volume pressure chambers connected separately to two braking circuits.

If one of the braking circuits associated with a master-cylinder of this type fails, as any person skilled in the art will readily appreciate, liquid leaking from the corresponding variable-volume chamber will produce a relatively long idle movement of the intake rod and of the brake pedal usually associated with it. Braking efficiency is therefore lost, and the designer must increase the total movement of the brake pedal.

In order to obviate these disadvantages, a master-cylinder according to the invention has a body comprising a blind stepped bore in which a stepped piston, operated by intake controlling means, is mounted so as to slide in a fluid-tight manner, the piston defining in the bore two variable-volume pressure chambers communicating separately with two outlet orifices in the body, and a single valve member which is adapted to close refill passages for replenishing the pressure chambers with hydraulic fluid, when the piston is moved into the bore by the intake controlling means.

A master-cylinder as just defined provides a considerable saving in space compared with tandem master-cylinders for double circuits.

According to another feature of the invention, the master-cylinder also comprises an annular sliding sleeve disposed coaxially between the small-diameter portions of the piston and of the bore and resilient means provided between the piston and sleeve in order to bring the sleeve to bear in a fluid-tight manner on the body so as to close the replenishing passages, upon actuation of said piston.

According to a further feature of the invention ring seals are mounted in grooves provided in the sleeve and are designed to cooperate in a fluid-tight manner with the end wall of the smaller diameter bore position and with the shoulder defined between the smaller diameter and larger diameter bore portions.

With such an arrangement, of course, the passages supplying the pressure chambers close simultaneously, and the risk of deterioration of the seals provided on the sleeve is reduced because the seals operate only under compression.

Figure 2:
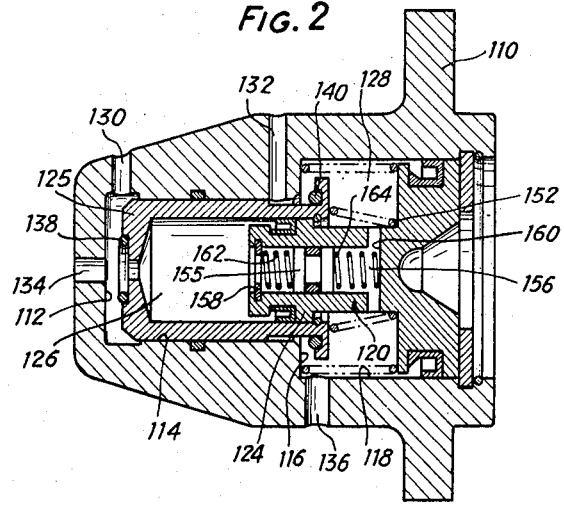

The invention will now be described with reference to the accompanying drawings, in which :

FIG. 1 illustrates a first embodiment of a master-cylinder for a double braking circuit, and FIG. 2 illustrates a second embodiment of a master-cylinder for a double braking circuit.

The master-cylinder shown in FIG. 1 has a body 10 containing a stepped blind bore, comprising an end wall 12, a small diameter portion 14, a shoulder 16 and a large diameter portion 18. A stepped piston 20 is slidably mounted in the blind bore and consists primarily of a large diameter portion 22, sliding in a fluid-tight manner in the bore portion 18, and of a smaller diameter portion 24 sliding in a fluid-tight manner in a sleeve 25, which in turn slides in a fluid-tight manner in the bore portion 14. This arrangement makes it possible to define two variable-volume pressure chambers : a first chamber 26 in the small diameter portion 14 and a second chamber 28 in the large diameter portion 18. The two chambers 26, 28 are supplied with brake fluid through two passages 30 and 32 respectively in the body 12. Opening of these passages is controlled by valve-member formed by the sleeve 25. The chambers 26, 28 are suitably connected to two sets of brake actuators (not shown) through two outlet orifices 34 and 36 respectively. As FIG. 1 shows, two O-ring seals 38, 40 are mounted in grooves in the sleeve 25, more particularly on its end face 27 and on a radial extension 29, so that they come to bear on the end wall 12 and shoulder 16 of the bore simultaneously. To this end the axial distance between the seals 38 and 40 is substantially equal to the axial distance between the end wall 12 and shoulder 16.

The relative arrangement of the supply passages 30 and 32, outlet orifices 34, 36, ring seals 38, 40 and a seal 42, which ensures fluid-tightness between the sleeve 25 and bore portion 14, will be noted. In particular, the passages 30 and 32 lead into the portion 14 on opposite sides of the seal 42. The outlet orifice 34 is coaxial with the seal 38, which, when urged on to an annular abutment surface on the end wall 12, prevents hydraulic communication between the orifice 30 and the outlet orifice 34. A hole 44 coaxial with the seal 38 is provided in the end 27 of the sleeve 25 to connect the chamber 26 to the outlet orifice 34. The seal 40, on the other hand, when urged on to an annular abutment surface on the shoulder, prevents hydraulic communication between the chamber 28 and an annular groove 46 situated on the exterior of the sleeve 25 and communicating with the passage 32.

This coaxial arrangement permits correct centering during operation of the principal components of the master-cylinder. Alternatively, of course, the same advantage can be obtained by placing the ring seals 38, 40 in respective grooves in the end wall 12 and shoulder 16.

In variants (not shown) of master-cylinders embodying the invention the arrangement of the outlet orifices and supply passages is reversed or altered, but the supply passages are still closed by movement of the annular sleeve acting as a valve.

A first spring 48 situated between the shoulder 16 and the piston 20 urges the latter into its idle position, in which it bears on a stop washer 50 mounted in the body. A second spring 52 is provided between the piston 20 and sleeve 25 to urge the sleeve into its idle position (shown in FIG. 1) when the piston 20 is in its idle position. Lastly, a blind hole 54 in the portion 22 of the piston 20 is intended to receive the end of an intake controlling rod (not shown), connected to a brake pedal by a mechanical connection or by way of an assisting servo-motor of any known type.

The master-cylinder described above operates as follows. The piston 20 and sleeve 25 occupy their idle positions (shown in FIG. 1) so that the variable-volume chambers 26, 28 are replenished with brake fluid. When an operator presses the brake pedal, the piston 20 moves to the left in FIG. 1. This movement causes the sleeve 25 to shift and bear in a fluid-tight manner on the end wall 12 and shoulder 16 of the bore. It will be noted that since the ring seals 38, 40 operate under compression, their resistance to wear is substantially increased. Subsequent movement of the piston 20 causes the fluid pressure in the chambers 26, 28 to rise and actuate the brakes. Obviously, the designer can select the effective cross-sections of the portions 22 and 24 of the piston 20 so as to produce the desired ratio between the braking pressures in the two sets of brake actuators. If one of the two brake circuits fails, assuming that the force exerted by the control rod on the piston 20 is constant, movement of the piston 20 remains very slight because the brake fluid is practically incompressible. A long idle movement of the brake pedal, which is liable to cause a loss of braking efficiency, is avoided by means of this arrangement.

In the master-cylinder shown in FIG. 2, elements identical to those shown in FIG. 1 have identical reference numerals plus one hundred and will not be described again. The essential difference between the two embodiments of the invention is a piston 155 slidably mounted in a fluid-tight manner in a passage 156 in the small diameter portion 124 of the stepped piston 120. The passage 156 communicates with both the chambers 126 and 128. The piston 155, which is movable between two abutments 158, 160, is held in a rest position (shown in FIG. 2) by two oppositely acting springs 162, 164.

Operation of the master-cylinder shown in FIG. 2 is similar to that previously described and will not be described in detail. It will be noted, however, that the presence of the piston 155 enables the braking pressures in the two sets of brake actuators to be made substantially identical whatever the quantity of brake fluid absorbed in the two braking circuits. This is because the piston 155, being subjected to the opposition effects of the fluid presures in the chambers 126, 126, moves into a balancing position in the passage 156.

In the event of failure of one of the braking circuits, for example that associated with the pressure chamber 126, the piston 155 moves to the left in FIG. 2 in proportion to the fluid loss in this circuit, until it comes to bear on the abutment 158. This results in a very slight shift of the piston 120, with no appreciable idle movement.

What I claim is:

1. A double master-cylinder comprising:
   a body having a blind stepped bore therein;
   a stepped piston correspondingly located in said stepped bore, said stepped piston cooperating with the stepped bore to establish two variable-volume pressurable chambers, said pressurable chambers communicating separately with two outlet orifices in the body and with two refill passages in the body; and
   a single valve member located in said stepped bore and connected to said stepped piston through the intermediary of a resilient means, said single valve member closing said two refill passages when the stepped piston is moved by an intake controlling means.

2. A master-cylinder as claimed in claim 1, wherein the single valve member consists in an annular sliding sleeve disposed coaxially between a first diameter portion of the stepped piston and of the stepped bore, said resilient means being located between a second diameter portion of the stepped piston and sleeve to position the sleeve in a fluid-tight manner on the body and close the refill passages upon movement of said stepped piston.

3. A master-cylinder as claimed in claim 1, wherein ring seals are mounted in grooves in the sleeve and are designed to cooperate in a fluid-tight manner with the end wall of a first diameter of the stepped bore and with a shoulder separating the first diameter of the stepped bore from a second diameter.

4. A master-cylinder as claimed in claim 3, including compensating means responsive to the fluid pressure in the variable-volume chambers for equalizing the pressures at the two outlet orifices.

5. A master-cylinder as claimed in claim 4, wherein the compensating means includes a piston mounted in a fluid-tight manner in a passage connecting the two variable-volume chambers, said piston being movable between two abutments under the influence of the fluid pressures in the said chambers.

6. A master cylinder as claimed in claim 5, including spring means located between said passage for positioning the piston therein in a balanced rest position.

7. A double master cylinder comprising:
   a body having a blind stepped bore with a smaller diameter portion and a greater diameter portion;
   a sleeve-shaped slidable valve member sealingly received in said small diameter portion, said valve member having an inner bore;
   a stepped piston having a smaller diameter portion sealingly received in said inner bore and a larger diameter portion sealingly received in said greater diameter portion of said stepped bore, said valve member and said stepped piston defining in said blind stepped bore two variable-volume pressure chambers communicating separately with two outlet orifices and two refill passages in the body; and resilient means located between said valve member and said greater diameter portion of said stepped piston, said valve member being shifted in said body through said resilient means for closing said refill passages when said stepped piston is moved by an intake controlling means.

8. The double master cylinder as recited in claim 7, wherein said valve member includes:
   ring seals for engaging the end wall of the smaller diameter portion of the stepped bore and with a shoulder separating the smaller diameter portion of the stepped bore from the greater diameter portion to establish a fluid tight separation for the closing of said refill passages.

9. The double master cylinder, as recited in claim 8, wherein said stepped piston includes:
   compensating means responsive to the fluid pressure in the two variable volume chambers for equalizing the fluid pressures at the two outlet orifices.

10. The double master cylinder, as recited in claim 9, wherein said compensating means includes:
    a slidable piston located in a passage in the stepped piston, said passage connects the two variable-volume chambers together, said slidable piston being moved between two abutments under the influence of the fluid pressures in said variable volume chambers.

11. The double master cylinder, as recited in claim 10, wherein said compensating means further includes:

spring means located in said passage for positioning the slidable piston therein in a balanced rest position.

* * * * *